(12) United States Patent
Marquis et al.

(10) Patent No.: US 8,774,383 B1
(45) Date of Patent: *Jul. 8, 2014

(54) OPTIMIZING ON-PREMISE CONFERENCING SOLUTIONS

(75) Inventors: Daniel J. Marquis, Omaha, NE (US);
Kenneth William Kurz, Overland Park, KS (US); Warren Edward Baxley, Erie, CO (US); Douglas Oneal Utley, Lenexa, KS (US)

(73) Assignee: West Corporation, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/532,850

(22) Filed: Jun. 26, 2012

Related U.S. Application Data (63) Continuation of application No. 12/702,432, filed on Feb. 9, 2010, now Pat. No. 8,229,096.

(51) Int. Cl.
*H04M 3/42* (2006.01)

(52) U.S. Cl.
USPC ............ 379/202.01; 379/203.01; 379/204.01; 379/205.01; 379/206.01; 379/207.01; 348/14.09; 455/416; 709/204

(58) Field of Classification Search
USPC .................... 379/202.01–207.01; 455/416
See application file for complete search history.

(56) References Cited

U.S. PATENT DOCUMENTS

| | | |
|---|---|---|
| 8,019,071 B2 | 9/2011 | Lukac |
| 2004/0199580 A1 | 10/2004 | Zhakov et al. |
| 2007/0260682 A1 | 11/2007 | Guccione |
| 2008/0263475 A1 | 10/2008 | Hwang |

*Primary Examiner* — Joseph J Nguyen (57) ABSTRACT

A method, a system, and computer readable medium comprising instructions for optimizing on-premise conferencing are provided. The method comprises receiving at least one call from at least one caller, identifying at least one call from at least one caller, and connecting the at least one call to a conference call bridge via a single connection.

11 Claims, 8 Drawing Sheets

OPTIMIZING ON-PREMISE CONFERENCING SOLUTIONS

CROSS-REFERENCE TO RELATED APPLICATIONS

This application is a continuation from U.S. patent application Ser. No. 12/702,432, filed Feb. 9, 2010, and entitled "OPTIMIZING ON-PREMISE CONFERENCING SOLUTIONS", which is incorporated by reference herein in its entirety.

FIELD OF THE DISCLOSURE

The present disclosure relates generally to on-premise conferencing. More particularly, the present disclosure provides a method, a system, and a computer readable medium comprising instructions for optimizing on-premise conferencing solutions.

BACKGROUND OF THE DISCLOSURE

A conference call is a conference by telephone in which two or more parties in different locations participate by means of a central switching unit, such as a cloud-based bridge. Before connecting to the central switching unit, parties who are located on the same premise are often connected to a local on-premise switch when a conference call is made.

In the currently state of the art, if one or more parties are located off the premise or at a different location, the local on-premise switch connects each on-premise party dialing into the conference call individually to a conference call bridge. This technique is inefficient, because it not only wastes bandwidth available on the bridge, it also adds costs associated with the premise for each individual conference call connection.

Therefore, what is needed is a new method and apparatus for optimizing conference calls between parties who are on-premise and off-premise without sacrificing bandwidths on the bridge and costs associated in making individual connections to the bridge.

SUMMARY OF THE DISCLOSURE

A method for optimizing conference call on a premise is provided. In one embodiment, the method comprises receiving at least one call from at least one caller, identifying at least one on-premise call from at least one caller on the premise, collecting the at least one on-premise call from the at least one call, and connecting the at least one on-premise call to a conference call bridge via a single connection.

The method further comprises notifying the at least one caller if a conference call is scheduled to begin by determining a scheduled time of a conference call, detecting that the scheduled time is approaching, sending a notification of the conference call to the at least one caller on the premise, retrieving information of the at least one caller from a database, and sending a notification of the conference call to at least one caller off the premise based on the information.

In an alternative embodiment, a system for optimizing conference call on a premise is provided. The system comprises at least one device utilized by at least one caller, a switching unit on a premise of the at least one caller that is communicably coupled to the at least one device, a conference call bridge communicably coupled to the switching unit, and a conference call optimizer application in the switching unit for connecting the at least one caller to the conference call bridge. The system further comprises database that is communicably coupled to the switching unit and the conference call bridge for storing information of the at least one caller.

DETAILED DESCRIPTION OF THE INVENTION

Figure 1:
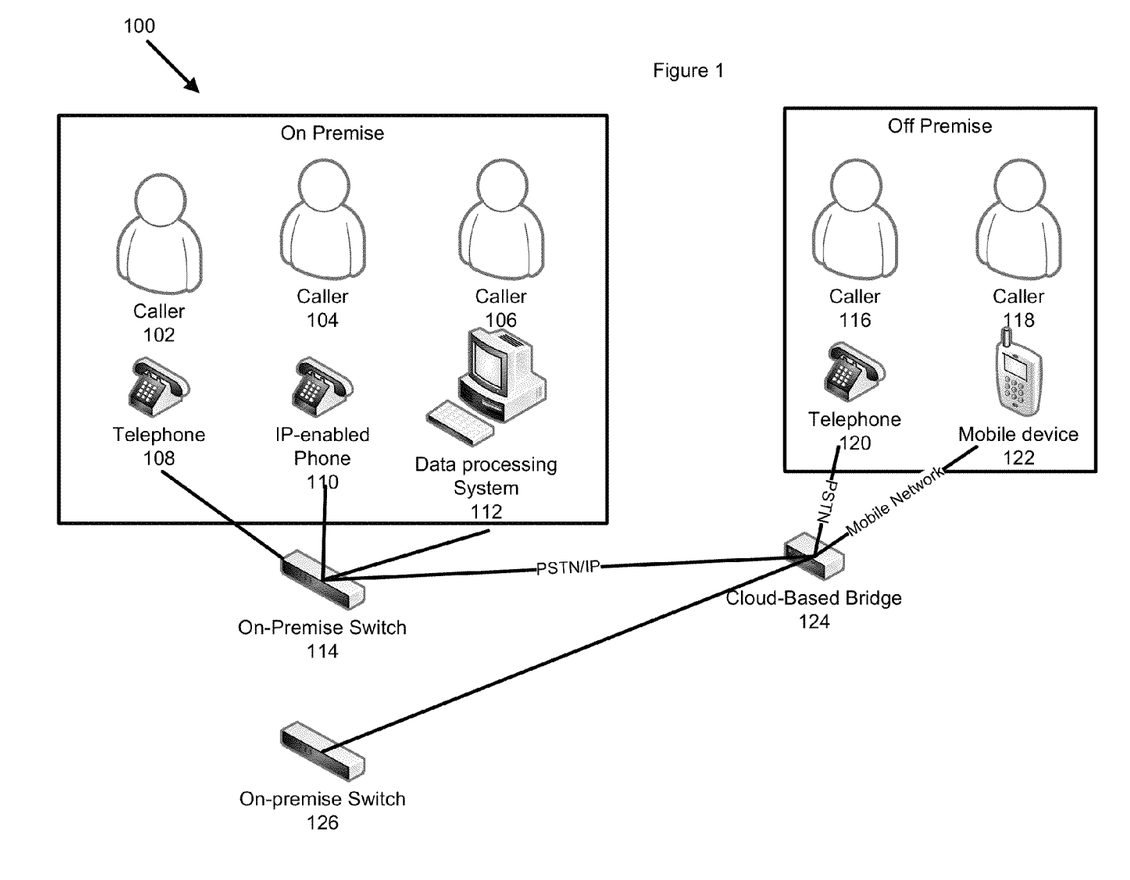
FIG. 1 depicts a diagram of an exemplary conference call system.

With reference to the figures and in particular with reference to FIG. 1, a diagram of an exemplary conference call system is depicted. In system 100, on-premise callers may participate in a conference call through a variety of means. In the context of the present disclosure, on-premise callers are callers who are physically located in the same location, for example, an office building, a site, a telecommunication system having multiple communication devices, etc. For example, caller 102 may participate in a conference call by dialing a 1-800 number using an analog or digital telephone 108 a 1-800 number. Similarly, caller 104 may participate in a conference call by dialing a 1-800 number using an Internet protocol (IP) enabled phone 110. In addition to telephones, caller 106 may participate in a conference call by dialing a 1-800 number or connecting to an IP address using a data processing system 112 having voice over Internet protocol (VoIP) applications.

System 100 comprises an on-premise switch 114 for receiving calls from on-premise callers and routing the calls to a conference call bridge if one or more parties are located off-premise. An example of an on-premise switch may be a PBX switch and an example of a conference call bridge is a cloud-based bridge 124. For example, on-premise switch 114 may, upon receiving a call from telephone 108, immediately makes a connection with cloud-based bridge 124 to connect caller 102 to a conference call. To connect telephone 108 to cloud-based bridge 124, on-premise switch may connect to the cloud-based bridge 124 via a public telephone service network (PSTN). Alternatively, on-premise switch 114 may connect callers 104 and 106 to the cloud-based bridge 124 via an Internet Protocol.

In this example, one or more callers may be dialing into the conference call from off the premise. For example, callers 116 and 118 may participate in the conference call by dialing a 1-800 number using telephone 120 and mobile device 112, respectively. Off-premise callers may directly be connected to the conference call bridge, such as cloud-based bridge 124. For example, caller 116 may be directly connected to the cloud-based bridge 124 via a PSTN and caller 118 may be directly connected to cloud-based bridge 124 via a mobile network. In addition to on-premise switch 114, cloud-based bridge 124 may handle conference calls initiated from other callers located at another premise, for example, callers from on-premise switch 126.

The transfer of information between the telephones 108 and 120, IP-enabled phone 110, data processing center 112, mobile device 122, on-premise switch 114, and cloud-based bridge 124 occurs via at least one of a wireless protocol, a wired protocol and the combination of the wireless protocol and the wired protocol. The steps performed in this figure are performed by software, hardware, firmware, and/or the combination of software, hardware, and/or firmware.

While on-premise switch 114 can handle conference calls initiated from the same premise, handling of the calls are performed inefficiently. For each caller who dialed in, on-premise switch 114 makes separate connections to the cloud-based bridge 124. For example, a connection from telephone 108 to cloud-based bridge 124 is separate from a connection from IP-enabled phone 110 to cloud-based bridge 124. An aggregate of these connections not only occupies a large amount of bandwidth on cloud-based bridge 124, it also leads to higher connection costs for each premise due to an aggregate of connection costs.

Figure 2:
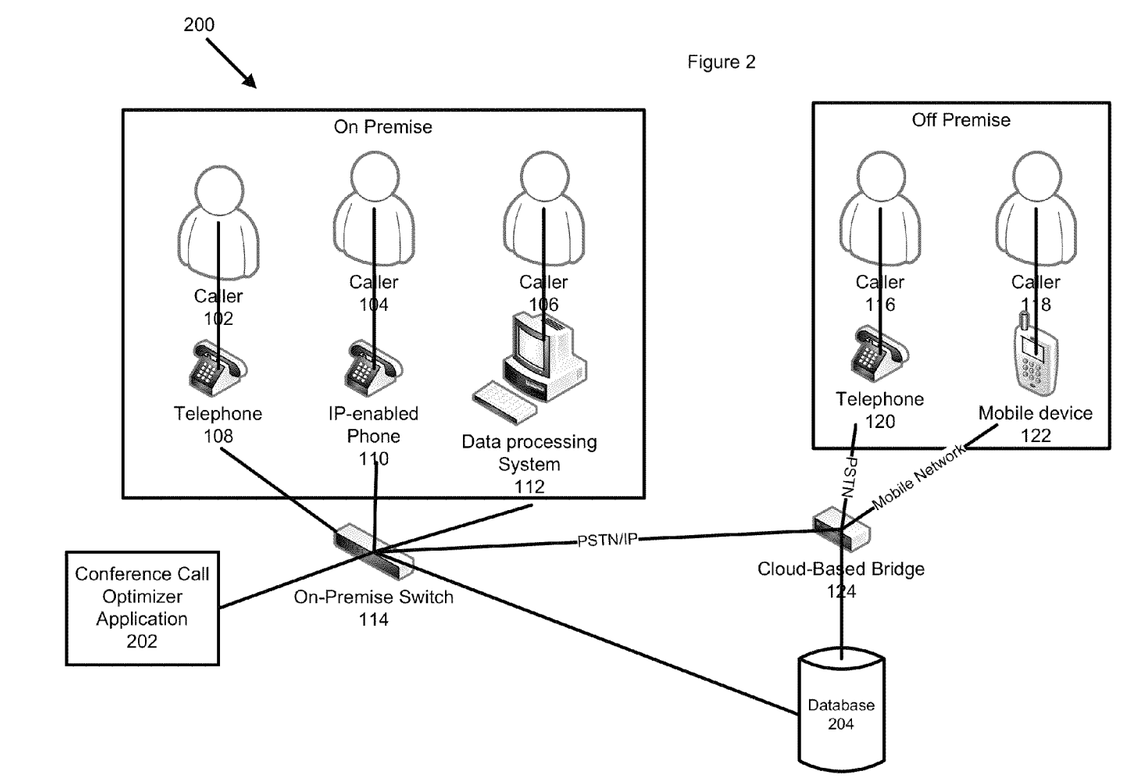
FIG. 2 depicts a diagram of a system for optimizing on-premise conferencing solutions in accordance with one embodiment of the present disclosure.

One aspect of the present disclosure provides a system for optimizing conference calls initiated from on-premise callers on an on-premise switch. Referring to FIG. 2, a diagram of a system for optimizing on-premise conferencing solutions is depicted in accordance with one embodiment of the present disclosure. System 200 comprises a conference call optimizer application 202, which is communicably coupled to the on-premise switch 114. In an alternative embodiment, conference call optimizer application 202 may be implemented as part of on-premise switch 114.

Instead of connecting on-premise callers to cloud-based bridge 124 via separate connections, conference call optimizer application 202 identifies calls from on-premise callers and collects the on-premise calls. Once all the on-premise calls are collected, conference call optimizer application 202 then makes a single connection to the cloud-based bridge 124 to connect all on-premise callers to the conference call. In this way, bandwidth of the cloud-based bridge may be reduced and associated connection costs may be minimized.

In addition to routing all on-premise calls via a single connection, conference call optimizer application 202 may identify the number of on-premise participants for a conference call and the capacity of the cloud-based bridge 124. If the number of on-premise callers for the conference call is within the capacity of the bridge, conference call optimizer application 202 may still allow individual connections by on-premise callers to the cloud-based bridge 124. Alternatively, conference call optimizer application 202 may force as many on-premise callers to the on-premise switch 114 up to the capacity of the cloud-based bridge 124 before making a single connection to the cloud-based bridge 124 to maximize the bandwidth of the bridge and minimize associated connection costs.

In addition to connecting on-premise callers, conference call optimizer application 202 may notify on-premise callers when a scheduled conference call is about to begin. For example, conference call optimizer application 202 may initiate a call to telephone 108 to notify caller 102 or send an email or text message to IP-enabled phone 110 and data processing system 112 to notify callers 104 and 106. In addition to on-premise callers, conference call optimizer application 202 may notify off-premise callers if one or more of them failed to dial in at the scheduled time. For example, caller 116 may be a leader of a conference call and failed to dial in at the scheduled time. Conference call optimizer application 202 may initiate a call to telephone 120 to notify caller 116.

Conference call optimizer application 202 may retrieve caller information from database 204. Database 204 comprises caller information including the caller's name, phone number, IP address, on-premise switch address, mobile phone number, automatic name identification (ANI), etc. Once caller information is retrieved from the database, conference call optimizer application 202 not only can identify which caller is from the same premise, it may also identify a caller to notify off premise.

Figure 3:
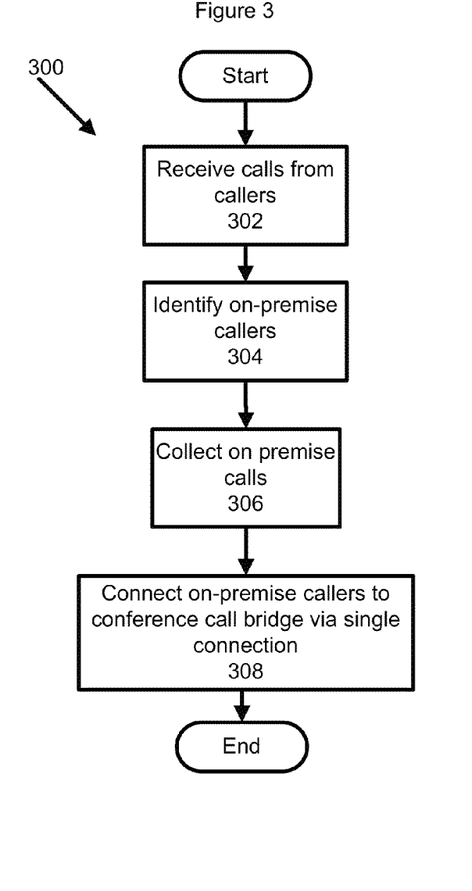
FIG. 3 depicts a flowchart of a process for optimizing on-premise conference call in accordance with one embodiment of the present disclosure.

Referring to FIG. 3, a flowchart of a process for optimizing on-premise conference call is depicted in accordance with one embodiment of the present disclosure. Process 300 may be implemented in a computer readable medium comprising instructions executing within on-premise switch 114. Process 300 begins at step 302 to receive calls for a conference call from callers. For example, on-premise switch 114 receives a call from caller 102 via telephone 108.

Upon receiving calls from callers, process 300 continues to step 304 to identify on-premise callers. More details regarding identifying on-premise callers are discussed with reference to FIG. 4 below. Process 300 then continues to step 306 to collect calls that are initiated by on-premise callers. More details regarding collecting calls initiated on-premise are discussed with reference to FIGS. 5 and 6 below. Process 300 then completes at step 308 to connect on-premise callers to the conference call bridge via a single connection.

Figure 4:
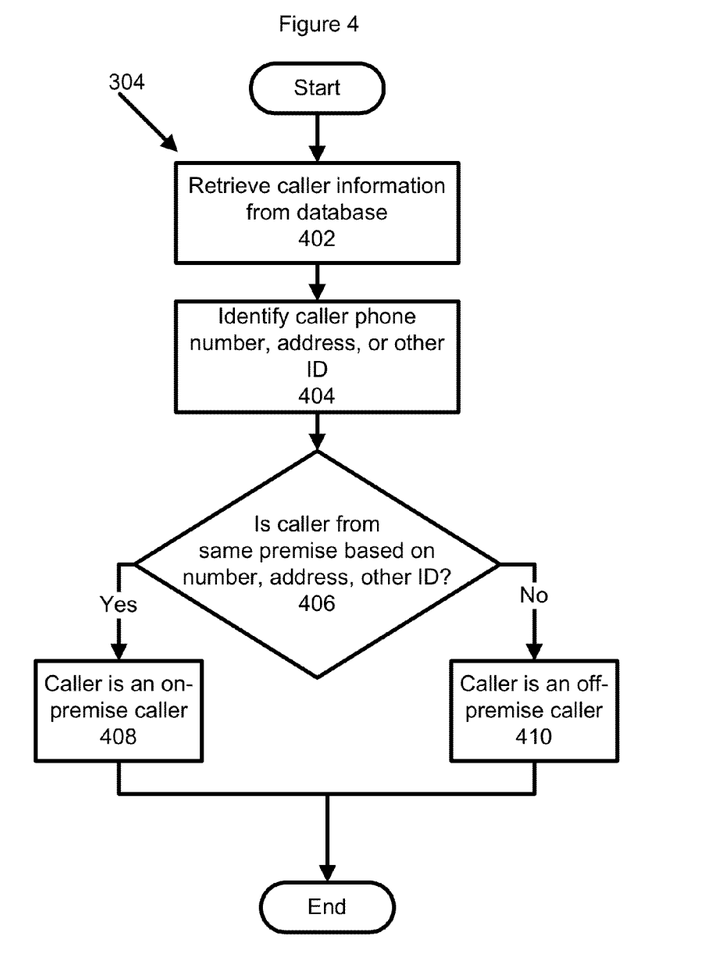
FIG. 4 depicts a flowchart of a process for identifying on-premise callers in accordance with one embodiment of the present disclosure.

Referring to FIG. 4, a flowchart of a process for identifying on-premise callers is depicted in accordance with one embodiment of the present disclosure. Process 304 may be implemented in a computer readable medium comprising instructions executing within on-premise switch 114. Process 304 begins at step 402 to retrieve caller information from database. Database 204 may comprise caller information including caller's phone number, IP address, location, etc.

Process 304 then continues to step 404 to identify the caller's phone number, IP address, or other identifier from the information retrieved from the database. For example, a caller's automatic name identification (ANI) may be identified. It is noted that alternative to storing caller information in the database, the caller information may be stored within the on-premise switch and retrieved from the on-premise switch in step 402 without departing the spirit and scope of the present disclosure.

Process 304 then continues to step 406 to determine whether the caller is from the same premise as the on-premise switch based on the number, address, or other identifier from step 404. If the caller is from the same premise as the on-premise switch, process 304 continues to step 408 to identify the caller as an on-premise caller. Otherwise, process 304 continues to step 410 to identify the caller as an off-premise caller.

Figure 5:
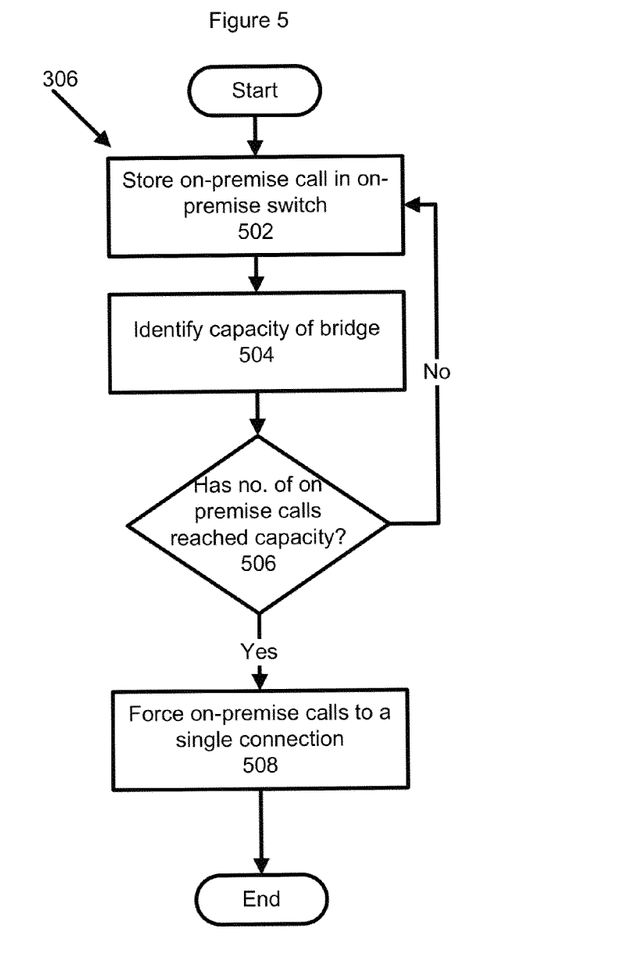
FIG. 5 depicts a flowchart of a process for collecting conference calls initiated on-premise in accordance with one embodiment of the present disclosure.

Referring to FIG. 5, a flowchart of a process for collecting conference calls initiated on-premise is depicted in accordance with one embodiment of the present disclosure. Process 306 may be implemented in a computer readable medium comprising instructions executing within on-premise switch 114. Process 306 begins at step 502 to store received on-premise calls in an on-premise switch. For example, conference call received from caller 102 may be stored in on-premise switch 114.

Process 306 then continues to step 504 to identify the capacity of the conference call bridge. The capacity of the conference call bridge may be the number of callers for a particular conference call the conference call bridge may handle. Process 306 then continues to step 506 to determine if the number of on-premise calls stored in step 502 has reached the capacity of the conference call bridge identified in step 504. If the number of on-premise calls has not reached the capacity of the conference call bridge, process 306 returns to step 502 to continue to store more on-premise calls. However, if the number of on-premise calls has reached the capacity of the conference call bridge, process 306 continues to step 508 to force the on-premise calls into a single connection. In this way, bandwidth required for the conference call bridge may be reduced and costs associated with connections are minimized.

Figure 6:
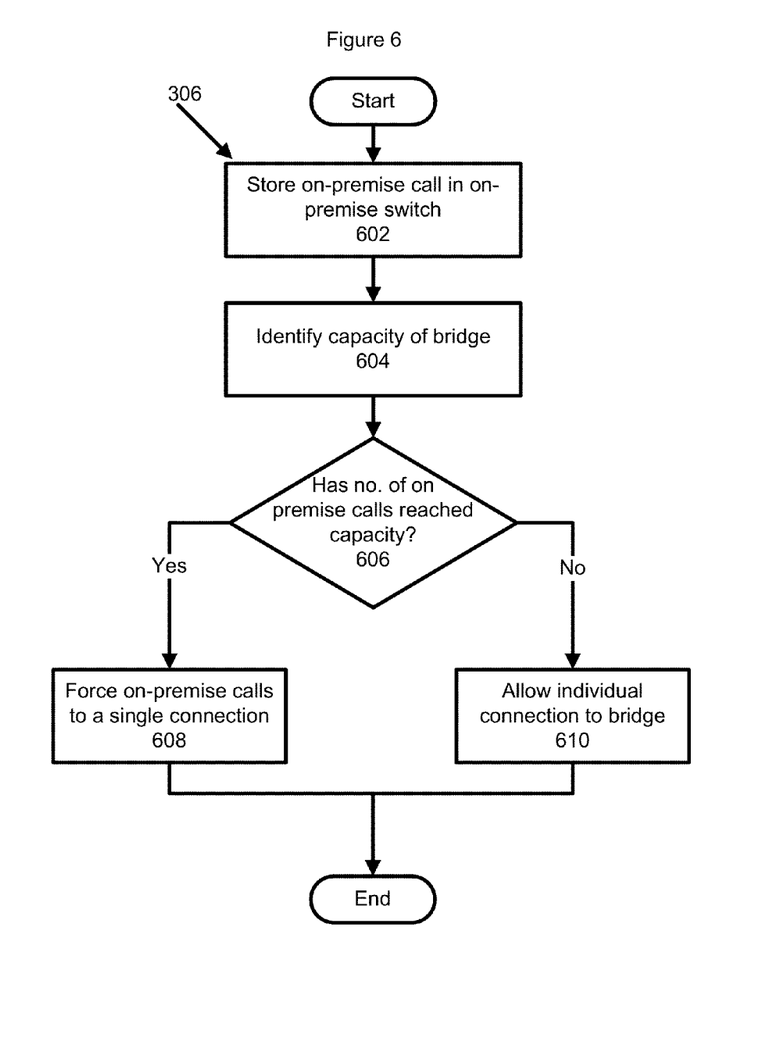
FIG. 6 depicts a flowchart of a process for collecting conference calls initiated on-premise in accordance with an alternative embodiment of the present disclosure.

Referring to FIG. 6, a flowchart of a process for collecting conference calls initiated on-premise is depicted in accordance with an alternative embodiment of the present disclosure. Process 306 may be implemented in a computer readable medium comprising instructions executing within on-premise switch 114. Process 306 begins at step 602 to store received on-premise calls in an on-premise switch. For example, conference call received from caller 102 may be stored in on-premise switch 114.

Process 306 then continues to step 604 to identify the capacity of the conference call bridge. The capacity of the conference call bridge may be the number of callers for a particular conference call the conference call bridge may handle. Process 306 then continues to step 606 to determine if the number of on-premise calls stored in step 602 has reached the capacity of the conference call bridge identified in step 604. If the number of on-premise calls stored has reached the capacity of the conference call bridge, process 306 continues to step 608 to force the on-premise calls into a single connection. However, if the number of on-premise calls stored has not reached the capacity of the conference call bridge, process 306 continues to step 610 to allow individual connections directly from the on-premise caller to the conference call bridge. In this way, on-premise calls will be forced into a single connection if the number of on-premise calls has exceeded the capacity of the conference call bridge. This provides flexibility in the on-premise switch when optimizing conference calls.

Figure 7:
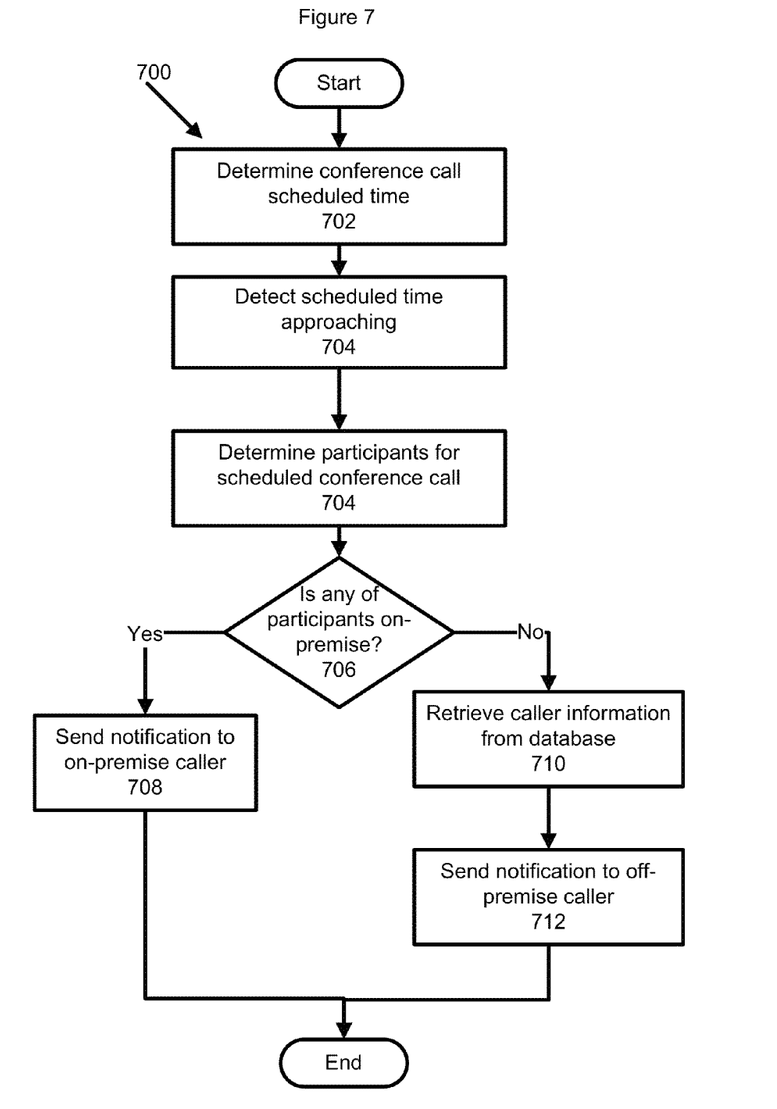
FIG. 7 depicts a flowchart of a process for notifying on-premise and off-premise callers of a conference call in accordance with one embodiment of the present disclosure.

As discussed above, in addition to connection on-premise callers to the conference call bridge, conference call optimizer application 202 may notify on-premise and off-premise callers when a scheduled conference call is about to begin or if a caller failed to dial in when the conference call has begun. Referring to FIG. 7, a flowchart of a process for notifying on-premise and off-premise callers of a conference call is depicted in accordance with one embodiment of the present disclosure. Process 700 may be implemented in a computer readable medium comprising instructions executing within on-premise switch 114.

Process 700 begins at step 702 to determine the scheduled time of the conference call. The scheduled time may be retrieved from within the on-premise switch or from the cloud-based bridge. Next, process 700 continues to step 704 to detect that the scheduled time for the conference call is approaching. If the scheduled time is approaching, process 700 continues to step 706 to determine participants for the scheduled conference call.

Process 700 then continues to step 708 to determine, for each participant, if the participant of the conference call is located on premise. This determination may be made based on the phone number, IP address, or other identifier of the participant. If the participant is located on premise, process 700 continues to step 708 to send a notification to the on-premise caller about the scheduled conference call. If the participant is not located on premise, process 700 continues to step 710 to retrieve caller information from the database. The information may include the participant's phone number off premise. Process 700 then completes at step 712 to send a notification to the off-premise caller about the scheduled conference call.

It is noted that conference call optimizer application 202 may send notifications in a variety of formats. For example, notifications may be sent via a telephone call, a text message, an email, an instant message, or other formats. In addition to retrieving caller information from the database, off-premise caller information may be retrieved from the cloud-based bridge or other systems. In addition to sending notifications, the cloud-based bridge may automatically dial the number of the off-premise participant and join the off-premise participant to the conference call.

Figure 8:
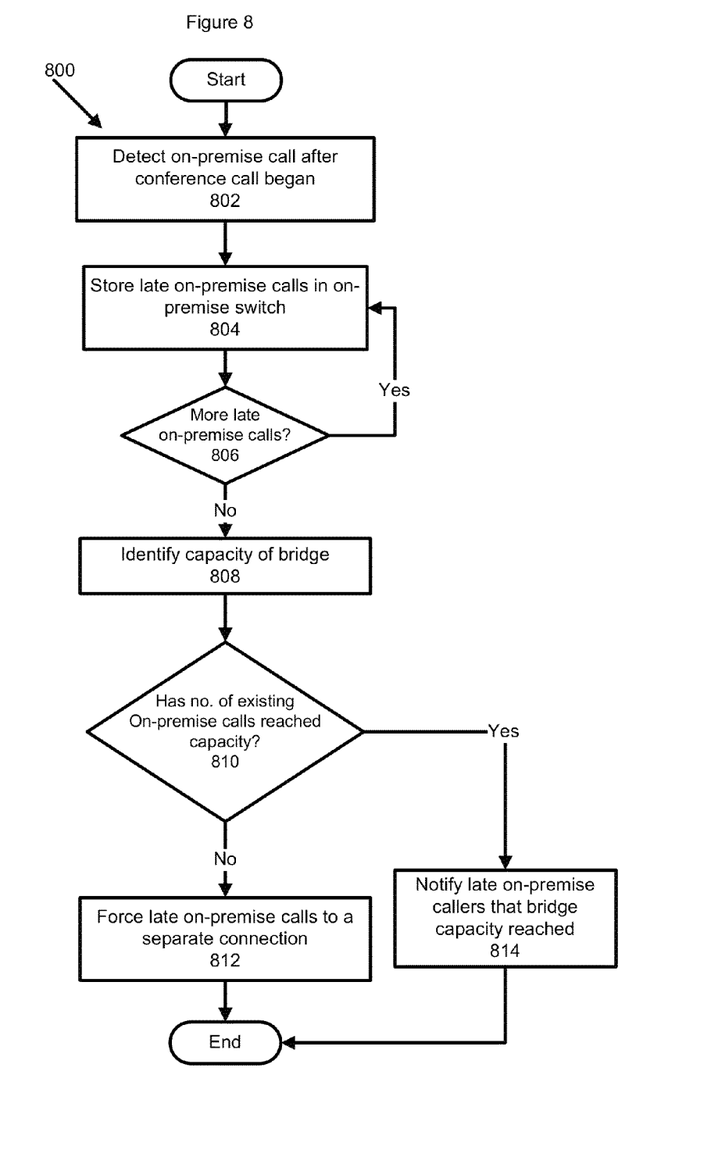
FIG. 8 depicts a flowchart of a process for optimizing on-premise conference call after the conference call has begun in accordance with one embodiment of the present disclosure.

Conference call optimizer application also optimizes on-premise conference calls based on the capacity of the conference call bridge once the conference call has begun. Referring to FIG. 8, a flowchart of a process for optimizing on-premise conference call after the conference call has begun is depicted in accordance with one embodiment of the present disclosure. Process 800 may be implemented in a computer readable medium comprising instructions executing within on-premise switch 114.

Process 800 begins at step 802 to detect at the on-premise switch a call initiated from an on-premise caller after the scheduled conference call has begun. Process 800 then continues to step 804 to store the late on-premise calls in the on-premise switch. Next, process 800 continues to step 806 to determine if more late on-premise calls are received from other participants. If more late on-premise calls are received, process 800 returns to step 804 to store other late on-premise calls in the on-premise switch. If no other late on-premise calls are received, process 800 continues to step 808 to identify the capacity of the conference call bridge.

Process 800 then continues to step 810 to determine if the number of existing on-premise calls has reached the capacity of the conference call bridge. If the number of existing on-premise calls has reached the capacity of the bridge, this means that no more on-premise callers may join the existing conference call. In response, process 800 continues to step 814 to notify on-premise callers that bridge capacity has been reached and no conference call may be connected.

However, if the number of existing on-premise calls has not reached the capacity of the bridge, this means that more on-premise callers may join the existing conference call. In response, process 800 continues to step 812 to force the late on-premise conference calls into a separate connection and connects the late on-premise callers to the conference call via the cloud-based bridge. By forcing late on-premise callers to join existing conference calls in a separate connection, bandwidth of the bridge may be reduced and costs associated with connecting with the bridge may also be minimized.

In summary, aspects of the present disclosure provide a method, a system, and a computer readable medium comprising instructions for optimizing on-premise conference calls. A conference call optimizer application is provided within an on-premise switch for collecting on-premise conference calls and connecting on-premise callers with the conference call bridge in a single connection. In addition to connecting on-premise callers, the conference call optimizer application sends on-premise and off-premise callers notifications of the conference call when the conference call is about to begin or has already begun. Furthermore, conference call optimizer application may join a late on-premise conference call to an existing conference call by forcing all late on-premise conference callers into a separate connection.

Although the above descriptions set forth preferred embodiments, it will be understood that there is no intent to limit the embodiment of the disclosure by such disclosure, but rather, it is intended to cover all modifications, substitutions, and alternate implementations falling within the spirit and scope of the embodiment of the disclosure. The embodiments are intended to cover capabilities and concepts whether they be via a loosely coupled set of components or they be converged into one or more integrated components, devices, circuits, and/or software programs.

What is claimed is:

1. A method, comprising:
   connecting at least one on-premise call to a conference call bridge;
   detecting at least one late on-premise call from at least one caller;
   storing the at least one late on-premise call in an on-premise switch;
   determining if the at least one conference call has reached a capacity of the conference call bridge;
   forcing the at least one late call into a separate connection if the at least one conference call has reached the capacity of the conference call bridge; and
   connecting the at least one late call to the conference call bridge via the separate connection.

2. The method of claim 1, wherein the at least one caller comprises at least one caller on the premise and at least one caller off the premise.

3. The method of claim 1 comprising receiving at least one call from at least one caller which comprises receiving at least one call from at least one of a telephone, a mobile device, a data processing system, and an Internet protocol enabled phone.

4. The method of claim 1 comprising identifying at least one on-premise call from at least one caller on the premise which comprises at least one of:
   retrieving information of the at least one caller from a database;
   identifying an identifier of at least one caller from the information;
   determining if the at least one caller is on the premise based on the identifier; and
   indicating at least one on-premise call from at least one caller on the premise if the at least one caller is on the premise based on the identifier.

5. The method of claim 1 comprising collecting the at least one on-premise call which comprises at least one of:
   storing the at least one on-premise call in an on-premise switch;
   identifying capacity of the conference call bridge;
   determining if the at least one on-premise call has reached the capacity of the conference call bridge.

6. The method of claim 5, further comprising forcing the at least one on-premise call to the single connection if the at least one on-premise conference call has reached the capacity of the conference call bridge.

7. The method of claim 5, further comprising connecting the at least one on-premise call to the conference call bridge individually if the at least one on-premise call has not reached the capacity of the conference call bridge.

8. The method of claim 1, further comprising notifying the at least one caller if a conference call is scheduled to begin.

9. The method of claim 8, wherein notifying the at least one caller if the conference call is scheduled to begin comprises at least one of:
   determining a scheduled time of a conference call;
   detecting that the scheduled time is approaching;
   sending a notification of the conference call to the at least one caller on the premise.

10. The method of claim 8, wherein notifying the at least one caller if the conference call is scheduled to begin comprises at least one of:
    retrieving information of the at least one caller from a database; and
    sending a notification of the conference call to at least one caller off the premise based on the information.

11. A non-transitory computer readable medium comprising instructions for connecting, via a separate connection, a late call to a conference call bridge that has reached capacity.

* * * * *